(12) United States Patent
Lipson et al.

(10) Patent No.: US 6,567,209 B2
(45) Date of Patent: May 20, 2003

(54) MICROCAVITY AMPLIFIERS

(75) Inventors: Michal Lipson, Waltham, MA (US); Lionel C. Kimerling, Concord, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 09/862,965

(22) Filed: May 22, 2001

(65) Prior Publication Data
US 2002/0039046 A1 Apr. 4, 2002

Related U.S. Application Data
(60) Provisional application No. 60/206,032, filed on May 22, 2000.

(51) Int. Cl.$^7$ ................................................. H01S 3/05
(52) U.S. Cl. .......................... 359/346; 359/344; 372/45
(58) Field of Search ........................... 395/346, 344; 372/45; 359/346, 344

(56) References Cited

U.S. PATENT DOCUMENTS

| | | | | |
|---|---|---|---|---|
| 5,249,195 A | * | 9/1993 | Feldman et al. | ............... 372/45 |
| 5,363,398 A | | 11/1994 | Glass et al. | ................... 372/92 |
| 5,414,726 A | * | 5/1995 | Raj et al. | .................... 359/243 |
| 5,436,759 A | * | 7/1995 | Dijaili et al. | ............... 359/333 |
| 5,933,444 A | * | 8/1999 | Molva et al. | ................. 372/75 |
| 6,320,996 B1 | * | 11/2001 | Scobey et al. | ............... 359/128 |
| 6,347,104 B1 | * | 2/2002 | Dijaili et al. | ................ 330/250 |

FOREIGN PATENT DOCUMENTS

EP    0 578 407 A1    1/1994

OTHER PUBLICATIONS

Zhou et al. Lasers and Electro–Optics Europe 2000 Sep. 10–15, 2000.*
Rennon et al. LEOS 2000 Nov. 13–16, 2000.*
Huang et al. J. of Lightwave Tech. vol. 12, No. 5 May 1994.*
Yamashita et al. Cleo '97 May 20, 1997.*
Yamashita et al. CLEO '99 Aug. 30–Sep. 3, 1999.*
A. M. Vredenberg et al., "Controlled Atomic Spontaneous Emission for $Er^{3+}$ in a Transparent $Si/SiO_2$ Microcavity", *Physical Review Letters*, vol. 71, No. 4, pp. 517–520 (Jul. 1993).

* cited by examiner

*Primary Examiner*—Thomas G. Black
*Assistant Examiner*—Stephen Cunningham
(74) *Attorney, Agent, or Firm*—Fish & Richardson P.C.

(57) ABSTRACT

A waveguide for amplifying electromagnetic radiation of a characteristic wavelength includes a first reflector, a second reflector, and a gain medium having a characteristic wavelength of emission disposed between the first and second reflectors. The first and second reflectors are spaced apart from each other to form a microcavity which is off-resonance with respect to the characteristic wavelength of light emitted by the excited gain medium.

36 Claims, 3 Drawing Sheets

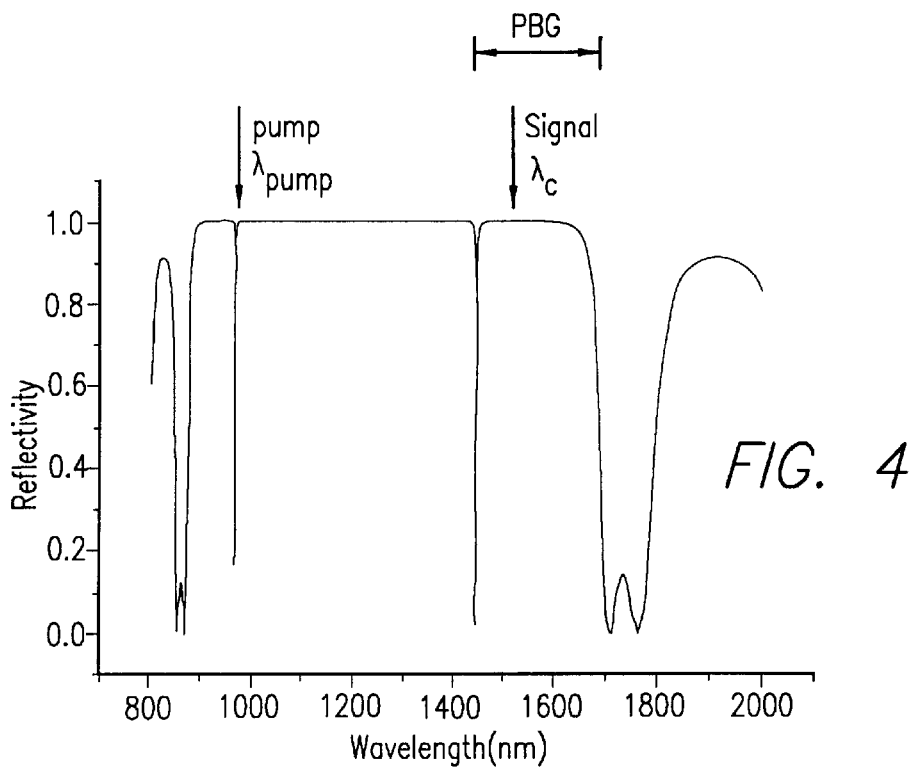
FIG. 4
FIG. 5
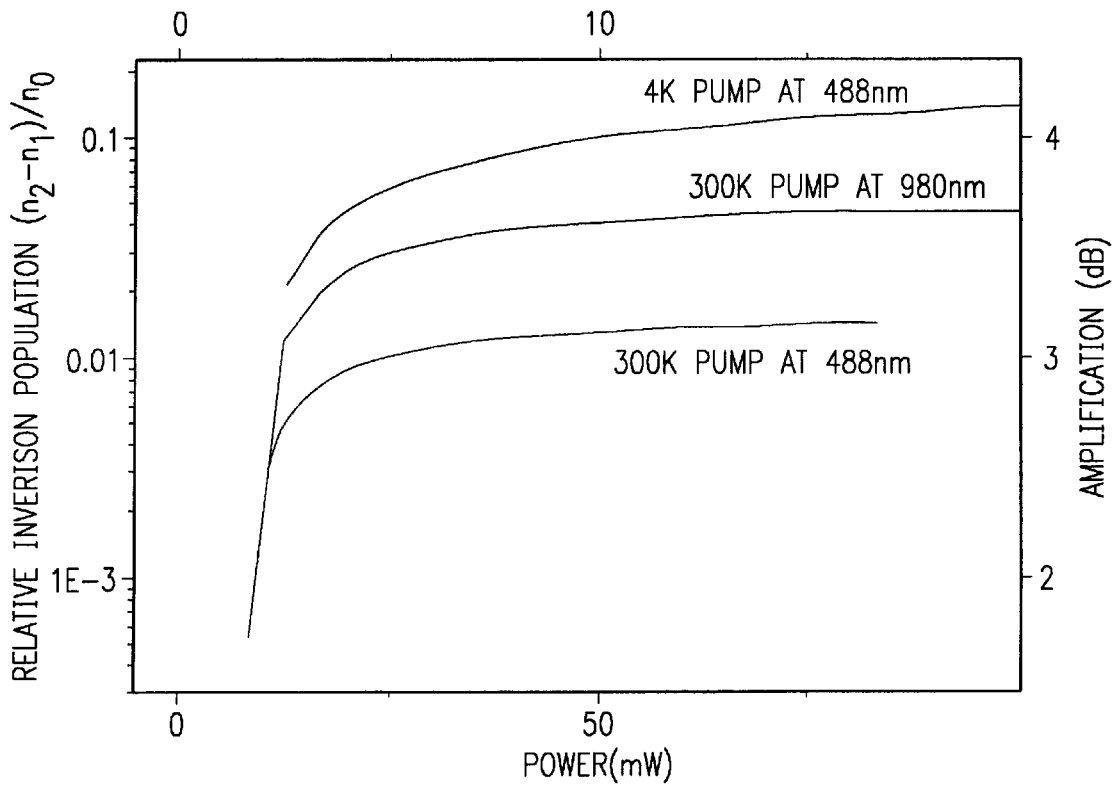

MICROCAVITY AMPLIFIERS

CROSS REFERENCE TO RELATED APPLICATIONS

Pursuant to 35 USC §119(e), this application claims the benefit of prior U.S. provisional application No. 60/206,032, filed May 22, 2000.

This invention was made with government support under DMIR-9808941 awarded by the National Science Foundation. The government has certain rights in the invention.

BACKGROUND

Fiber optic amplifiers have revolutionized the telecommunication field by amplifying the intensity of light signals traveling through fiber optic telecommunication networks. The fiber optic amplifiers doped with a gain medium, such as Erbium, are capable of emitting radiation of a specific wavelength when excited by an external light source. The gain medium is chosen such that the emission wavelength overlaps a wavelength of the light signal. As the light signal travels through the amplifier, an external source excites the gain medium and the light signal stimulates the excited medium to emit radiation. The amount by which an amplifier increases the intensity of a light signal, gain, is proportional to the absorption cross-section of the doped material, the length of the amplifier, and the population inversion concentration. The population inversion concentration is the difference between the amount of doped material in an excited state, capable of emitting the specific wavelength of the light signal, relative to the amount of doped material in a lower state separated from the excited state by an energy equivalent to the emission of the specific wavelength of the light signal.

Due to low doping levels in fiber optic amplifiers of less than about $10^{20}/cm^3$, the population inversion concentration is low. As a result, fiber optic amplifiers typically have lengths on the order of tens of meters in order to offset the effects of low population inversion concentration and thereby amplify the light signal. In highly doped fiber optics, such as those including between $10^{21}/cm^3$ and about $10^{23}/cm^3$ of the doped material, the distance between the doped material in the fiber is relatively small which causes atom—atom interactions. These interactions decrease the population inversion concentration which, in turn, limits the amount of light amplification per meter of the fiber optic.

SUMMARY

In general, the invention features a microcavity that increases the population inversion of a gain material embedded in a waveguide. Microcavities including gain material having a doping concentrations greater than about $10^{20}/cm^3$, such as between $10^{21}/cm^3$ and about $10^{23}/cm^3$, compensates for atom—atom interactions and increases the population inversion. An increased population inversion provides an increased level of gain. The population inversion is proportional to the radiative lifetime of the gain material in an excited state, i.e., longer radiative lifetimes correspond to higher population inversion concentrations.

In one aspect, the invention features a waveguide for amplifying electromagnetic radiation of a characteristic wavelength. The waveguide includes a first reflector and a second reflector, and a gain medium disposed between the first and second reflectors, the gain medium having a characteristic wavelength of emission. The first reflector and the second reflector are spaced apart from each other to form a microcavity which is off-resonance with the characteristic wavelength to minimize the overlap between electromagnetic radiation of the characteristic wavelength and the gain medium.

Embodiments of this aspect may include one or more of the following. The length of the gain medium in a direction parallel to the reflectors is less than about 10 cm. The length of the gain medium in a direction parallel to the reflectors is less than about 5 cm. The length of the gain medium in a direction parallel to the reflectors is about 1 cm or less. The microcavity has a cavity spacing, D, that is any non-integer multiple of $\lambda_c/2n$, where n is the index of refraction of the gain medium and $\lambda_c$ is the characteristic wavelength of emission. D is greater than $\lambda_c$, and an odd multiple of $\lambda_c/4n$. D is about 5 microns or less. Each of the reflectors includes a metal film. The reflectors includes distributed Bragg reflectors (DBR). Each DBR includes alternating layers of materials having different indices of refraction. The alternating layers of materials include one or more materials selected from the group consisting of semiconductors, conductive matter oxides, glasses, glass-like oxides, and polymers. The alternating layers have high and low indices of refraction, nH and nL, and thicknesses on the order of $\lambda/4n_H$ and $\lambda/4n_L$. Each DBR includes between 2 and 22 alternating layers. The gain medium includes one or more lanthanide series elements with numbers 57 through 71. The gain medium includes Er. The gain medium includes $Er_2O_3$ embedded in a layer of $SiO_2$. The gain medium includes crystalline $Er_2O_3$. The gain medium includes a rare earth doped layer of Si. The gain medium includes a rare earth doped layer of $SiO_2$. The gain medium has a concentration greater than about $10^{20}/cm^3$.

In another aspect, the invention features an optical amplifier for amplifying an optical signal including a doped gain medium having an inlet and an outlet, a first reflector adjacent to and extending along the doped gain medium perpendicular to the inlet and the outlet, and a second reflector adjacent to and extending along the doped gain medium opposite to the first reflector and perpendicular to the inlet and the outlet. The doped gain medium has an index of refraction lower than an average index of refraction of the first reflector and the second reflector, and the first reflector and the second reflector reflect omnidirectionally a characteristic wavelength of light emitted by the gain medium dopant.

Embodiments of this aspect may include one or more of the following. The length between the inlet and outlet of the doped gain medium is less than about 10 cm. The length between the inlet and outlet of the doped gain medium is less than about 5 cm. The length between the inlet and outlet of the doped gain medium is about 1 cm or less. The reflectors and the doped gain medium form a cavity having a spacing, D, that is any non-integer multiple of $\lambda_c/2n$, where n is the index of refraction of the doped gain medium and $\lambda_c$ is the characteristic wavelength of light emitted by the rare earth composition. D is greater than $\lambda_c$, and an odd multiple of $\lambda_c/4n$. D is about 5 microns or less. The reflectors include distributed Bragg reflectors (DBR). Each DBR includes alternating layers of materials having different indices of refraction. The alternating layers of materials include one or more materials selected from the group consisting of semiconductors, conductive matter oxides, glasses, glass-like oxides, and polymers. The alternating layers have high and low indices of refraction, $n_H$ and $n_L$, and thicknesses on the order of $\lambda/4n_H$ and $\lambda/4n_L$. Each DBR includes between 2 and 22 alternating layers. The gain medium dopant includes one or more lanthanide series elements with numbers 57 through 71. The gain medium dopant includes Er. The doped gain medium comprises $Er_2O_3$ embedded in a layer of $SiO_2$. The doped gain medium includes a rare earth doped layer of Si. The doped gain medium includes a rare earth doped layer of $SiO_2$. The doped gain medium includes a dopant at a concentration greater than about $10^{20}/cm^3$.

Embodiments of the invention can include one or more of the following advantages. The microcavity includes a microstructure using highly doped materials in which total population inversion can be obtained. Total population inversion is obtained by controlling the electromagnetic field intensity in the amplifier. The device can be monolithically integrated into Si for microphotonic applications. This invention provides an optical amplifier of sub-micron size using highly doped structures as an amplifying medium. The micro-scale amplifiers having lengths on the order of ~1 μm–1 cm and high doping concentrations, such as greater than $10^{20}/cm^3$, can provide increased gain per length relative to conventional macro-scale amplifiers having the same doping concentrations.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 4 is a spectral response spectrum of the amplifier in which an $Er_2O_3$ waveguide embedded between $Si/SiO_2$ reflectors.

FIG. 5 is the calculated amplification for $Er_2O_3$ waveguide embedded between $Si/SiO_2$ reflectors.

DETAILED DESCRIPTION

The invention features a method and structure for increasing gain in optical signal amplifiers, such as microcavity amplifiers, by increasing the population inversion of the gain medium. Fermi's Golden rule predicts that the radiative lifetime is proportional to the effective overlap between the gain material and electromagnetic radiation of the characteristic wavelength. Smaller overlap between the gain material and electromagnetic radiation of the characteristic wavelength within the amplifier provides an increased radiative lifetime of the gain material relative to larger overlaps. In a microcavity amplifier, overlap of electromagnetic radiation of the characteristic wavelength and the gain material is determined by the design of the microcavity. In order to maximize the population inversion, the microcavity is designed to be off-resonance with respect to the characteristic wavelength and thereby minimize the overlap between the gain material and the electromagnetic radiation of the characteristic wavelength.

Figure 1:
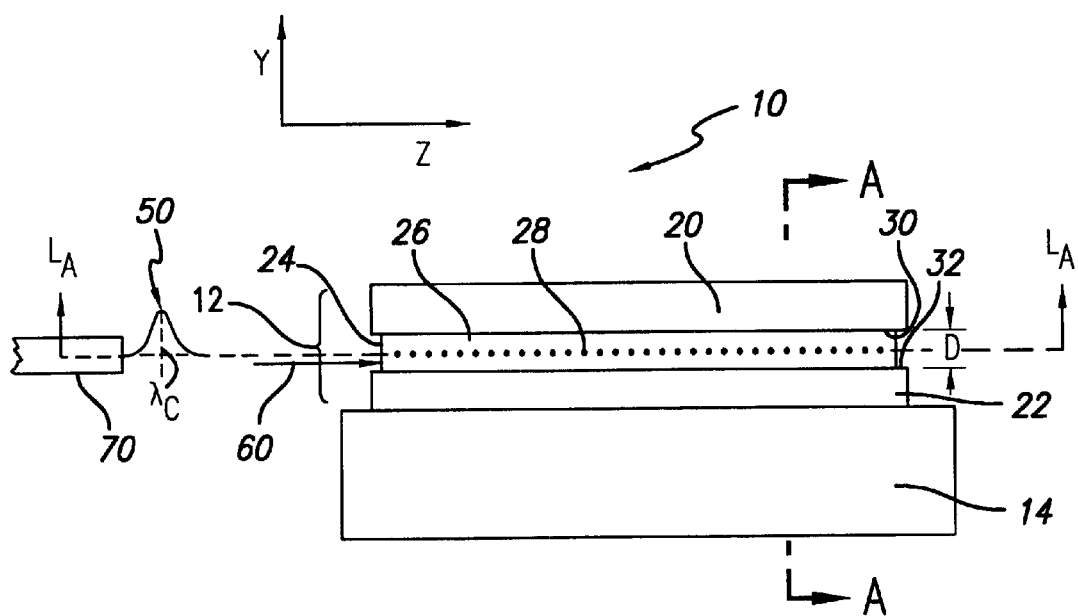
FIG. 1 is cross-sectional view of a microcavity amplifier.

Referring to FIG. 1, an optical amplifier 10 includes a microcavity 12 formed on a surface of a substrate 14, such as silicon. Microcavity 12 includes a waveguide 24 disposed between an upper reflector 20 and a lower reflector 22. Waveguide 24 includes a gain material 28 embedded in a support material 26. In general, the gain material can be embedded in the support material 26 in any concentration. Typically, the concentration of gain material is greater than about $10^{20}/cm^3$. When excited by external electromagnetic radiation of wavelength, $\lambda_{pump}$, gain material 28 emits electromagnetic radiation of a characteristic wavelength, $\lambda_c$, so long as $\lambda_{pump}$ is less than or equal to $\lambda_c$ and gain material 28 absorbs $\lambda_{pump}$. The microcavity formed by the reflectors is constructed such that the cavity is off-resonance with respect to the characteristic wavelength, $\lambda_c$, emitted by gain material 28. In an off-resonance cavity, the length, D, of microcavity 12, i.e., the distance between an inner surface 30 of upper reflector 20 and an inner surface of 32 of lower reflector 22, is adjusted to be any non-integer multiple of $\lambda_c/2n$, where n is the index of refraction of the support material. Typically, D is greater than the optical wavelength, $\lambda_c$, and an odd multiple of $\lambda_c/4n$. D can be on the order of a micon. For example, D is about 5 microns or less.

In operation, a light signal 50 having a wavelength coincident with the characteristic wavelength, $\lambda_c$, of the gain material exits a fiber optic cable 70 and enters microcavity 12 along its longitudinal axis, $L_A$, for amplification. A pump signal 60 of wavelength $\lambda_{pump}$ excites gain material 28 into an excited state capable of emitting electromagnetic radiation of a characteristic wavelength, $\lambda_c$. Although shown in FIG. 1 as being substantially collinear with light signal 50, pump signal 60 may be directed transverse to microcavity 12, i.e., perpendicular to the longitudinal axis, so long as the reflectors transmit the wavelength $\lambda_{pump}$. Light signal 50 propagates through the gain medium and is amplified when light signal 50 stimulates the gain material in the excited state to emit light of $\lambda_c$. The amount of amplification or gain in the intensity of light signal 50 is given by:

$$\gamma = \alpha \Delta N L$$

where $\alpha$ is the absorption cross section of the gain material, $\Delta N$ is difference between the amount of gain material in the excited state relative to the amount of gain material in the lowest or ground state, e.g., the population inversion concentration of the gain material. L is the length of the amplifier. In general, the amplifier length can be selected to provide the desired level of gain. Due the optical amplifier's ability to increase the population inversion of the gain material, optical amplifier 10 can provide high levels of gain at lengths on the order of a centimeter or less.

The reflectors may be in the form of thin metal films, distributed Bragg reflectors (DBRs), and layers of conductive semi-transmissive oxides. The microcavity can also be formed of two different types of reflectors. Examples of metals for producing thin metal films include Ag, Au, Al, Cr, and Cu. DBRs typically include pairs of layered materials in which each layer of the pair has a different refractive index. Examples of materials for these layers include, but are not limited to, semiconductors, conductive oxides, glasses, and glass-like oxides. Examples of semiconductors include tetrahedrally bonded semiconductor materials such as Si, Ge, GaAs, GaP, InP, GaInAs, GaInPAs, and semiconductor materials, such as ZnS, ZnSe. Conductive oxides include cadmium tin oxide (CTO) and indium tin oxide (ITO). Examples of glasses include $SiO_2$, phosphosilicates, borosilicates and borophosphosilicates, boronaluminum silicates, germanates, tellurites and fluorides, and glass-like oxides from $Al_2O_3$ and $TiO_2$.

Examples of support materials include, but are not limited to, organic polymers, glasses such as $SiO_2$, phosphosilicate glass, borosilicate glass, borophosphosilicate glass, boronaluminum silicate glass, germanate glass, tellurite glass, fluoride glass and such glass-like materials as oxides, e.g. $Al_2O_3$, $TiO_2$, or nitrides, e.g. $Si_3N_4$, while tetrahedrally bonded semiconductor materials such as Si, Ge, GaAs, GaP, InP, GaInAs, GaInPAs, semiconductor materials such as ZnS, ZnSe, and conductive oxides such as $CdSnO_3$ and $InSnO_3$, belong to the latter.

The gain material is any material which can be excited into a state capable of emitting electromagnetic radiation of a desired wavelength. Examples of gain materials include, but are not limited to, atoms and compounds of rare earth elements of the lanthanide series, such as $Er_2O_3$.

Depending on the support material of the gain medium, the gain material may be incorporated into the support material via any known manner, such as by implantation or sputtering with subsequent annealing, or chemical vapor deposition.

Figure 2:
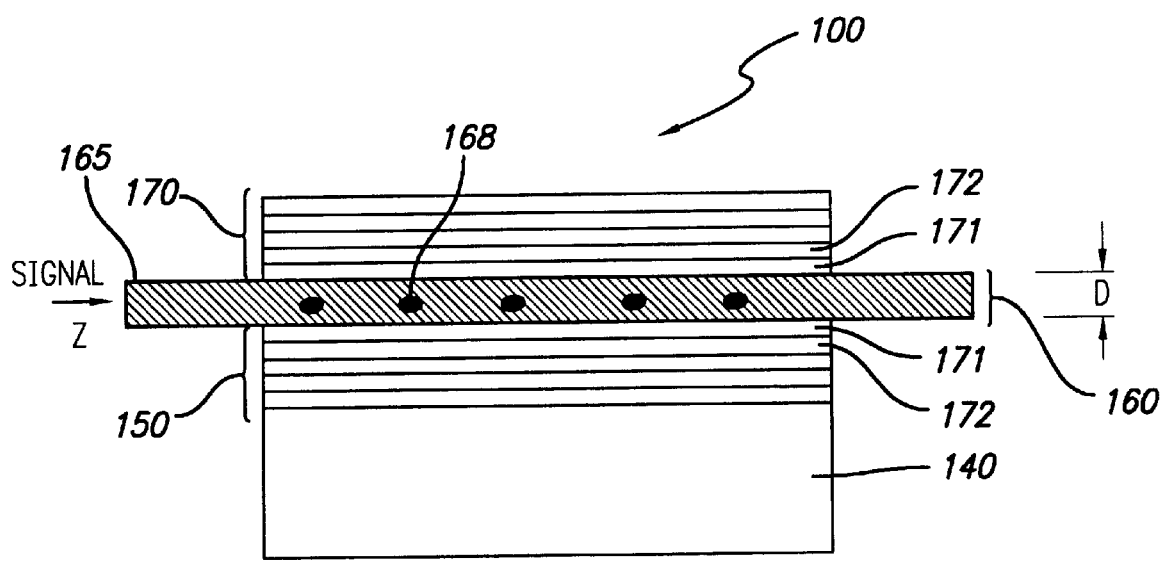
FIG. 2 is a cross-sectional view of another microcavity amplifier.

Referring to FIG. 2, a microcavity amplifier 100 is a multi-layered structure and includes, in ascending order, a substrate 140, a bottom reflector 150, a waveguide 160, and a top reflector 170. Waveguide 160 includes a support material 165 doped with Erbium 168 in an amount between $10^{21}/cm^3$ and about $10^{23}/cm^3$. Both reflectors are distributed Bragg reflectors (DBR's) including pairs of layered materials. Each DBR consists of a plurality of pairs of quarter-wave layers, e.g. 171 and 172. Each pair includes a layer having an index of refraction, which is higher, $n_H$, than the index of refraction of another layer of the pair, $n_L$. The thickness of each of layers 171 and 172 are on the order of an optical wavelength and are, typically, equal to $\lambda/4n_1$ and $\lambda/4n_2$, where $n_1$ and $n_2$ are the indices of refraction of layers 171 and 172, respectively. The relative order of layer 171 and 172 depends upon the index of refraction of the waveguide 160, $n_w$. If $n_w$ is higher than $n_H$, then the DBR layer having the lower index of refraction, $n_L$, is disposed adjacent to the doped support material. If $n_w$ is lower than $n_H$, then the DBR layer having the higher index of refraction, $n_H$, is disposed adjacent to the doped support material. The total thickness of the waveguide 160, D, is on the order of a micron and is any non-integer multiple of $\lambda_c/2n_w$. Preferably, the total thickness is an odd number multiple of $\lambda/4n_w$, where $n_w$ is the index of refraction of the waveguide layer. The total number of pairs of quarter-wave layers depends upon the desired reflectivity of the DBR's. For example, the DBR can include 2 to 22 pair of pairs of quarter-wave layers. The reflectivity of the DBR reflectors is proportional to $$R = 1 - 4\left(\frac{n_L}{n_H}\right)^{2M}$$

where M is the number of periods, and $n_H$ and $n_L$ are defined above.

The light signal to be amplified propagates in the z direction and has a wavelength equal to the characteristic wavelength, $\lambda_c$, emitted by an Erbium transition from an excited state (2) to a lower state (1). External electromagnetic radiation of wavelength, $\lambda_{pump}$, (not shown) excites the Er atoms to state 2 so long as $\lambda_{pump}$ is less than or equal to $\lambda_c$ and Erbium absorbs $\lambda_{pump}$. The objective of the DBRs is to increase the radiative lifetime of the Erbium in the excited state (2) in all directions except those in which the light signal propagates through the microcavity about the longitudinal axis by providing omnidirectional reflection of $\lambda_c$. The increase in radiative lifetime induces a strong population inversion between states 1 and 2 thereby increasing the gain or amplification of the light signal.

Using standard transfer matrix formalisms, such as described by Lipson et al. in "Optical Physics", (Cambridge University Press, Cambridge (1995), and Winn et al. in "Omnidirectional reflection from a one-dimensional photonic crystal," Optics Letters 23, p. 1573–1575 (1998), the DBR reflectors are designed to be omnidirectional by reflecting the characteristic wavelength of the gain material in all directions, substantially all incident angles, except those in which the light signal propagates through the microcavity about the longitudinal axis, e.g., the incident angle is approximately zero. The low index of refraction of the waveguide relative to the average index of refraction of the DBRs accounts for the omnidirectionality of the reflectors. Photonic crystals are described, for example, in "Pbotonic Crystals: Molding the Flow of Light" by Joannopoulos et al.

Figure 3:
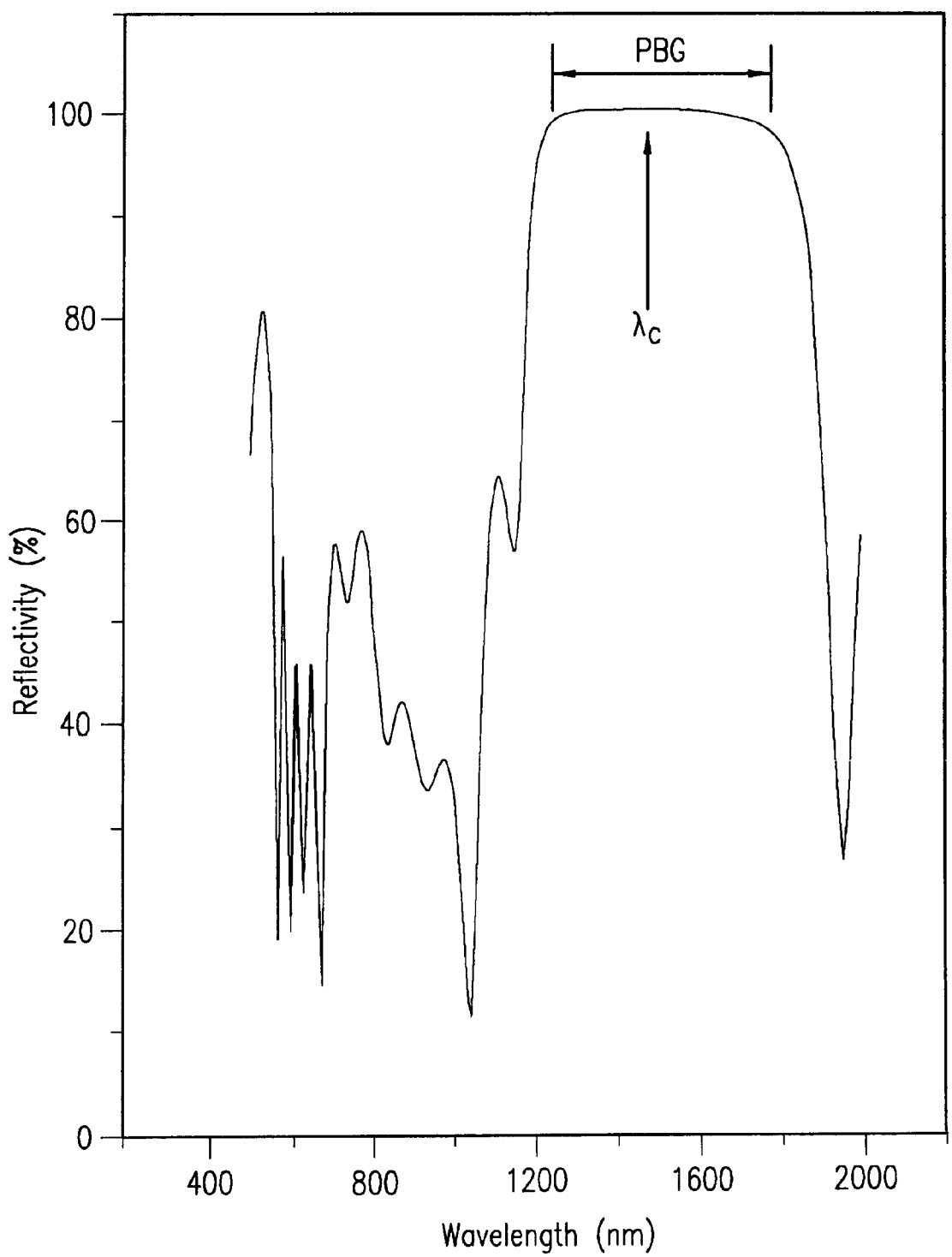
FIG. 3 is a spectral response spectrum of a distributed bragg reflector.

Referring to FIG. 3, the spectral response of a DBR recorded at 90 degrees incidence includes a photonic band gap, PBG, region. At different angles of incidence, the PBG region of the DBR shifts to higher and lower wavelength regions. The DBRs are designed to include a PBG region which overlaps the characteristic wavelength of the gain material at all angles of incidence except those in which the light signal propagates through the microcavity about the longitudinal axis. The spectral response of the microcavity is also designed to be off-resonant with the electromagnetic radiation of the characteristic wavelength, $\lambda_c$.

In a particular embodiment, the microcavity amplifier includes a waveguide of $Er_2O_3$ embedded between DBRs. The $Er_2O_3$ layer has a thickness of 512 nm and is confined on both sides by four pairs of $Si/SiO_2$ layers, in which the layers of each pair have a thickness of 821 nm and 1916 nm, respectively. External pump radiation of 980 nm excites $Er^{3+}$ to an excited state having a transition to the ground state of about 1530 nm thereby creating population inversion. The spectral response of the structure is given in FIG. 4 in which the $\lambda_C$=1530 nm occurs in the PBG.

The resulting population inversion and amplification of such a structure for different pump wavelength and temperatures is given in FIG. 5. At a 980 nm pump excitation of 10 mW power, a 1530 nm light signal is amplified by 3.5 dB/cm at room temperature.

A number of embodiments of the invention have been described. Nevertheless, it will be understood that various modifications may be made without departing from the spirit and scope of the invention. For example, the described structure can be highly manufacturable and may be integrated with silicon-based microelectronics. The gain medium in the microcavity amplifier can be excited optically or electrically to provide gain at a characteristic wavelength. The pump excitation can be directed co-linear with the longitudinal axis of the gain medium or transverse to the reflectors. When exciting the gain medium transversely, the reflectors should transmits that wavelength, $\lambda_{pump}$. For example, as shown in FIG. 4, $\lambda_{pump}$ occurs in a transmissive region of the DBR.

Accordingly, other embodiments are within the scope of the following claims.

What is claimed is:

1. A waveguide for amplifying electromagnetic radiation of a characteristic wavelength comprising:

a first reflector and a second reflector, and a gain medium disposed between the first and second reflectors, the vain medium having a characteristic wavelength of emission, wherein the first reflector and the second reflector are spaced apart from each other to form a microcavity and the microcavity has a cavity spacing, D, that is any non-integer multiple of $\lambda_c/2n$, where n is the index of refraction of the gain medium and $\lambda_c$ is the characteristic wavelength of emission.

2. The waveguide of claim 1, wherein a length of the gain medium in a direction parallel to the reflectors is less than about 10 cm.

3. The waveguide of claim 1, wherein a length of the gain medium in a direction parallel to the reflectors is about 1 cm or less.

4. The waveguide of claim 1, wherein D is greater than $\lambda_c$, and an odd multiple of $\lambda_c/4n$.

5. The waveguide of claim 1, wherein each of the reflectors comprises a metal film.

6. The waveguide of claim 1, wherein the reflectors comprise distributed Bragg reflectors (DBR).

7. The waveguide of claim 1, wherein the gain medium comprises one or more lanthanide series elements with numbers 57 through 71.

8. The waveguide of claim 1, wherein the gain medium has a concentration greater than about $10^{20}/cm^3$.

9. The waveguide of claim 2, wherein a length of the gain medium in a direction parallel to the reflectors is less than about 5 cm.

10. The waveguide of claim 4, wherein D is about 5 microns or less.

11. The waveguide of claim 6, wherein each DBR comprises alternating layers of materials having different indices of refraction.

12. The waveguide of claim 11, wherein the alternating layers of materials comprise one or more materials selected from the group consisting of semiconductors, conductive matter oxides, glasses, glass-like oxides, and polymers.

13. The waveguide of claim 11, wherein the alternating layers have high and low indices of refraction, $n_H$ and $n_L$, and thicknesses on the order of $\lambda/4n_H$ and $\lambda/4n_L$.

14. The waveguide of claim 11, wherein each DBR includes between 2 and 22 alternating layers.

15. The waveguide of claim 7, wherein the gain medium comprises Er.

16. The waveguide of claim 15, wherein the gain medium comprises $Er_2O_3$ embedded in a layer of $SiO_2$.

17. The waveguide of claim 15, wherein the gain medium comprises crystalline $Er_2O_3$.

18. The waveguide of claim 15, wherein the gain medium comprises a rare earth doped layer of Si.

19. The waveguide of claim 15, wherein the gain medium comprises a rare earth doped layer of $SiO_2$.

20. An optical amplifier for amplifying an optical signal comprising:

a doped gain medium having an inlet and an outlet, a first reflector adjacent to and extending along the doped gain medium perpendicular to the inlet and the outlet, and a second reflector adjacent to and extending along the doped gain medium opposite to the first reflector and perpendicular to the inlet and the outlet, wherein the doped gain medium has an index of refraction lower than an average index outlet, refraction of the first reflector and the second reflector, and the first reflector and the second reflector reflect onmidirectionally a characteristic wavelength of light emitted by the gain medium dopant, and the reflectors and the doped gain medium form a cavity having a spacing, D, that is any non-integer multiple of $\lambda_c/2n$, where n is the index of refraction of the doped gain medium and $\lambda_c$ is the characteristic wavelength of light emitted by the rare earth composition.

21. The optical amplifier of claim 20, wherein a length between the inlet and outlet of the doped gain medium is less than about 10 cm.

22. The optical amplifier of claim 20, wherein a length between the inlet and outlet of the doped gain medium is about 1 cm or less.

23. The optical amplifier of claim 20, wherein D is greater than $\lambda_c$, and an odd multiple of $\lambda_c/4n$.

24. The optical amplifier of claim 20, wherein the reflectors comprise distributed Bragg reflectors (DBR).

25. The optical amplifier of claim 20, wherein the gain medium dopant comprises one or more lanthanide series elements with numbers 57 through 71.

26. The optical amplifier of claim 20, wherein the doped gain medium comprises a rare earth doped layer of Si.

27. The optical amplifier of claim 20, wherein the doped gain medium comprises a rare earth doped layer of $SiO_2$.

28. The optical amplifier of claim 20, wherein the doped gain medium includes a dopant at a concentration greater than about $10^{20}/cm^3$.

29. The optical amplifier of claim 21, wherein a length between the inlet and outlet of the doped gain medium is less than about 5 cm.

30. The optical amplifier of claim 23, wherein D is about 5 microns or less.

31. The optical amplifier of claim 24, wherein each DBR comprises alternating layers of materials having different indices of refraction.

32. The optical amplifier of claim 31, wherein the alternating layers of materials comprise one or more materials selected from the group consisting of semiconductors, conductive matter oxides, glasses, glass-like oxides, and polymers.

33. The optical amplifier of claim 31, wherein the alternating layers have high and low indices of refraction, $n_H$ and $n_L$, and thicknesses on the order of $\lambda/4n_H$ and $\lambda/4n_L$.

34. The optical amplifier of claim 31, wherein each DBR includes between 2 and 22 alternating layers.

35. The optical amplifier of claim 25, wherein the gain medium dopant comprises Er.

36. The optical amplifier of claim 35, wherein the doped gain medium comprises $Er_2O_3$ embedded in a layer of $SiO_2$.

* * * * *